(12) United States Patent
Söhnchen et al.

(10) Patent No.: US 8,960,723 B2
(45) Date of Patent: Feb. 24, 2015

(54) QUICK-RELEASE CLOSURE FOR A VEHICLE-FIXED END OF A SEAT BELT IN A MOTOR VEHICLE

(75) Inventors: Arndt Söhnchen, Hamburg (DE); Jens Ehlers, Horst (DE); Sören Wenzel, Linden (DE); Alexander Supthut, Prisdorf (DE)

(73) Assignee: Autoliv Development AB, Värgäda (SE)

( * ) Notice: Subject to any disclaimer, the term of this patent is extended or adjusted under 35 U.S.C. 154(b) by 174 days.

(21) Appl. No.: 13/807,432

(22) PCT Filed: Apr. 14, 2011

(86) PCT No.: PCT/EP2011/001893
§ 371 (c)(1),
(2), (4) Date: Feb. 15, 2013

(87) PCT Pub. No.: WO2012/000577
PCT Pub. Date: Jan. 5, 2012

(65) Prior Publication Data
US 2013/0140420 A1   Jun. 6, 2013

(30) Foreign Application Priority Data
Jun. 30, 2010   (DE) .......................... 10 2010 025 714

(51) Int. Cl.
*B60R 22/00* (2006.01)
*B60R 22/18* (2006.01)

(52) U.S. Cl.
CPC ...................................... *B60R 22/18* (2013.01)
USPC ..................................................... 280/801.1

(58) Field of Classification Search
CPC ........ A44R 22/18; A44R 22/22; B60R 22/18; B60R 22/22

USPC .......... 280/801.1; 403/326, 331, 361; 24/628, 24/629, 633, 645
See application file for complete search history.

(56) References Cited

U.S. PATENT DOCUMENTS 4,373,830 A * 2/1983 Ikesue ........................... 403/284
4,402,114 A * 9/1983 Takagi ....................... 24/579.11

(Continued)

FOREIGN PATENT DOCUMENTS

DE           102 45 818 A1    4/2003
DE    20 2004 008 623 U1    1/2005

(Continued)

OTHER PUBLICATIONS

PCT International Search Report—Jul. 27, 2011.
German Search Report—Jan. 2, 2012.

*Primary Examiner* — Paul N Dickson
*Assistant Examiner* — Robert A Coker
(74) *Attorney, Agent, or Firm* — Brinks Gilson & Lione

(57) ABSTRACT

A quick-release closure for a vehicle-mounted end of a seat belt in a motor vehicle having a fitting part, and a vehicle-mounted attachment part. A first opening is provided in the fitting part, in which one end of the seat belt can be attached by means of a loop which is guided through the first opening. A second opening is provided, in which the attachment part can be locked to a locking head. In the second opening a spring element is provided that can be moved from a mounting position) into a locking position. The locking head of the attachment part can be inserted into the opening in which the spring element is arranged in the mounting position, and the spring element can be moved into the locking position by a relative movement of the locking head with respect to the fitting part, securing the locking head in position.

16 Claims, 4 Drawing Sheets

(56) References Cited

U.S. PATENT DOCUMENTS

| | | | |
|---|---|---|---|
| 4,471,513 A * | 9/1984 | Ogawa | 24/579.11 |
| 4,520,538 A * | 6/1985 | Sano et al. | 24/682.1 |
| 4,575,916 A * | 3/1986 | Naitoh et al. | 24/579.11 |
| 5,181,402 A * | 1/1993 | Faessler et al. | 70/18 |
| 2003/0071453 A1* | 4/2003 | Holzapfel | 280/801.1 |

FOREIGN PATENT DOCUMENTS

| | | |
|---|---|---|
| DE | 10 2008 004 338 A1 | 7/2009 |
| DE | 10 2010 025 714 A1 | 1/2012 |
| WO | 01 42063 A1 | 6/2001 |

* cited by examiner

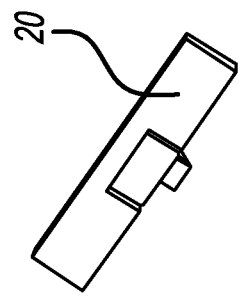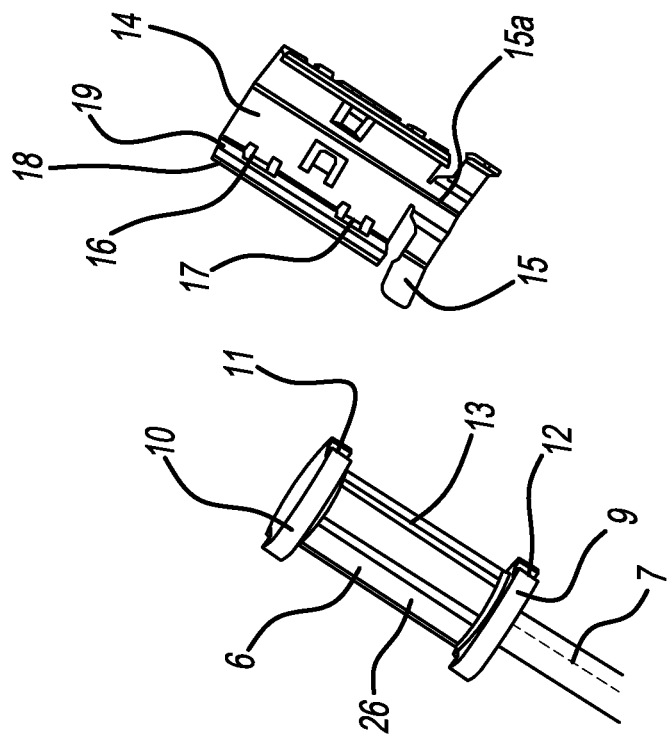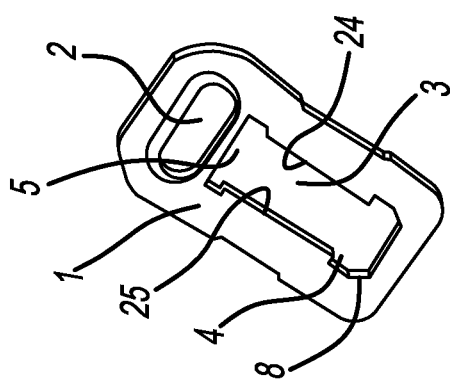
FIG-1

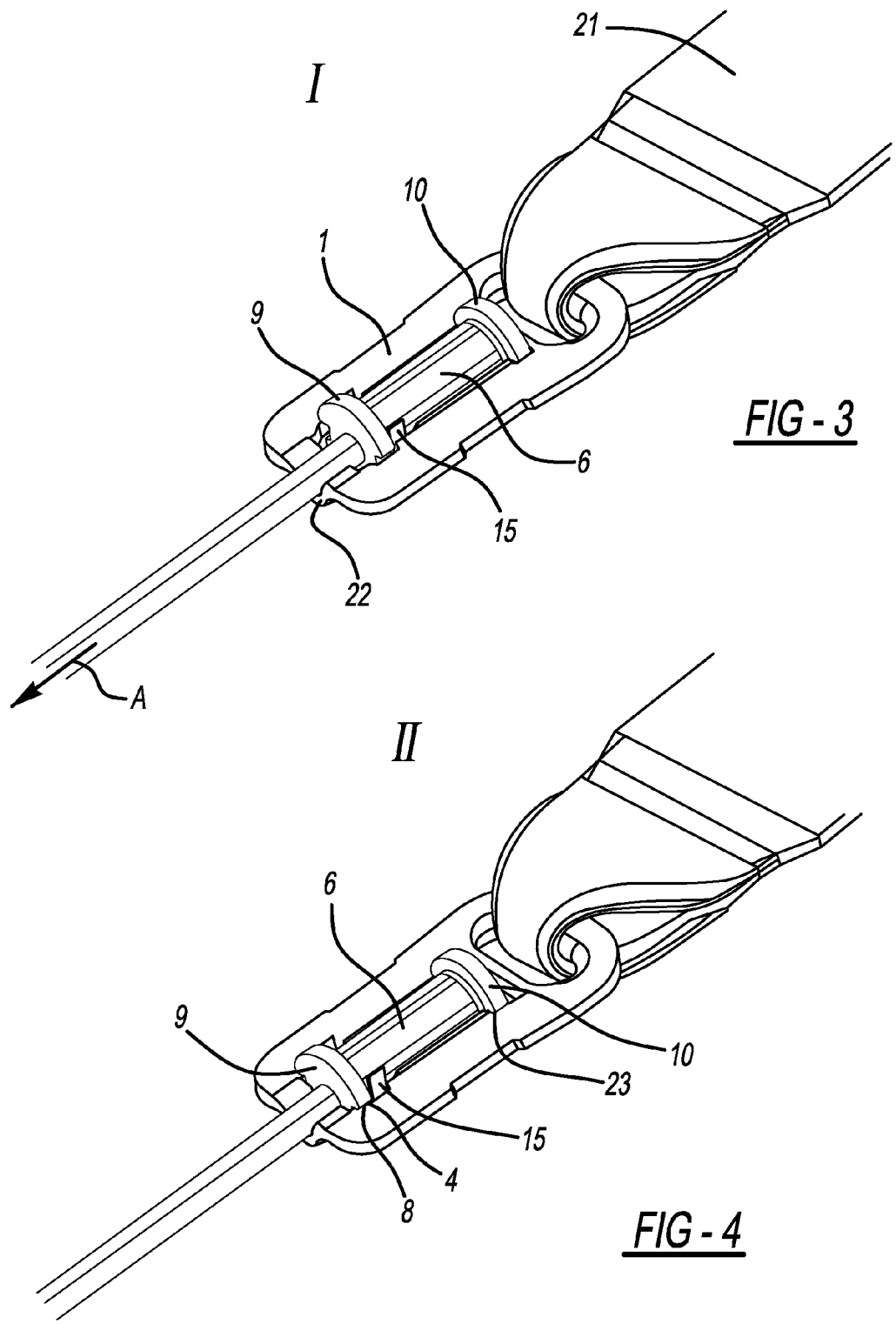

QUICK-RELEASE CLOSURE FOR A VEHICLE-FIXED END OF A SEAT BELT IN A MOTOR VEHICLE

CROSS REFERENCE TO RELATED APPLICATIONS

This application claims priority to German Patent Application No. 10 201 0 025 714.1, filed Jun. 30, 2010 and PCT/EP2011/001893, filed Apr. 14, 2011.

FIELD OF THE INVENTION

The invention relates to a quick-release closure for a vehicle-mounted end of a seat belt in a motor vehicle.

BACKGROUND OF THE INVENTION

Seat belts according to the prior art are permanently attached at one end to the structure of the motor vehicle by means of an end fitting, whereas the other end of the belt webbing can be rolled up onto a belt retractor that is also permanently affixed to the structure of the motor vehicle.

However, there are various applications where a detachable connection must be provided between the end fitting and the structure of the motor vehicle. For structural or logistical reasons related to motor vehicle assembly it may be necessary, for example, in the case of a safety-belt system with an end-fitting tensioner (such as a so called pretensioner), for the end-fitting tensioner to be affixed first to the structure of the motor vehicle or to a seat of the motor vehicle, and the seat belt with the end fitting then connected in a second assembly step to the end-fitting tensioner via a quick-release closure. In this case, the mounting of the end fitting on the end-fitting tensioner is done by the motor-vehicle manufacturer, so that it should be possible to handle the quick-release closure according to the requirements of the motor vehicle manufacturers as cost-efficiently and simply as possible. Furthermore, the quick-release closure should be designed such that incorrect mounting by the motor vehicle manufacture can be ruled out, even during very rapid assembly.

Furthermore, a quick-release closure of this kind enables separate manufacture and delivery of the end-fitting tensioner and the safety-belt system to the vehicle manufacturer. Moreover, the quick-release closure enables a detachable connection of the vehicle-mounted end of the seat belt to the motor vehicle, so that this end of the seat belt of the safety-belt system can be disassembled with less effort and expense.

From DE 102 45 818 A1, a generic quick-release closure is known that has a locking element comprised of two spring-loaded pincer elements. In this case, the connection of the seat belt to the motor vehicle takes place by means of a vehicle-mounted locking tongue that is inserted between the pincer elements and is then held by them. The pincer elements themselves are pivotably mounted between a two-layered end fitting. A disadvantage of this solution is that the quick-release closure, due to the two-layer end fitting and the pincer elements mounted between the layers, has a complicated design, which in turn results in greater time and expense being needed for assembly. The task of the invention is to devise a generic, cost-efficient quick-release closure with a simple constructional design.

INTRODUCTORY DESCRIPTION OF THE INVENTION

According to the basic idea of the invention, it is proposed that in the second opening of the closure, a spring element is provided that can be moved from a mounting position into a locking position, and the locking head of the attachment part can be inserted into the second opening in which the spring element is arranged in the mounting position, and the spring element can be moved into the locking position by executing a relative movement of the locking head with respect to the fitting part, which secures the locking head against slipping out. With the inventive solution, the assembly of the quick-release closure can be carried out in only two assembly steps, namely by inserting the locking head into the second opening and then by executing a relative movement of the locking head with respect to the fitting part. This requires neither a particular tool nor special manual skill on the part of the person doing the mounting. Furthermore, the quick-release closure is assembled from only three basic elements, which can be mass-produced at low cost, and which require no special positioning with respect to each other during assembly. In this way the quick-release closure is overall highly cost-efficient, both as regards assembly and production.

Furthermore, it is proposed that the second opening has a snap contour against which the spring element rests in the locking position. The spring element resting against the snap contour prevents the spring element and the locking head, which is secured in the locking position by the spring element, from being unintentionally released from the locking position. Because the snap contour can be molded into the fitting part at no additional cost during manufacture, and the spring element, due to its spring properties automatically comes to rest against the snap contour, it is also possible to secure the locking head with no increase in the cost of manufacturing and mounting the quick-release closure.

In this case, the catching of the spring element can be accomplished in a particularly simple manner if the spring element has at least one protruding spring arm, and the spring element interlocks with the spring arm on the snap contour. To this end, the spring arm can have a different spring stiffness than the spring element, for example by means of its shape in the direction of the snap contour.

It is also proposed that the spring arm or arms be arranged over a narrowing in the material of the spring element. Due to the narrowing, the spring arms are intentionally arranged in a flexible manner on the spring element. The spring element can therefore be seen as a basic element that serves the purpose of affixing and guiding the spring element in the fitting part before and during the assembly process and as delivered to the motor vehicle manufacturer. The spring arms serve only to snap-fit the spring element and lock the locking head into the fitting part.

Furthermore, it is proposed that two spring arms are provided, which in the locked position exert spring forces acting in opposite directions on the fitting part. The proposed design prevents the spring arms from moving, or at least not moving simultaneously, out of the snapped-in position during lateral accelerations, because independently of the direction of the lateral accelerations, and even if one spring arm is moved out of the snapped-in position, the other spring arm will in each case be pushed with greater force in the opposite direction into the snapped-in position. This kind of interlocking of the spring arms prevents the locking head from being unintentionally moved out of the locking position during lateral accelerations.

Furthermore, it is proposed that the spring element is comprised of a spring plate shaped such that it affixes itself in the mounting position in the first opening through the action of an initial spring tension on the fitting part. The spring element can thus be arranged on the fitting part in a preassembly step and delivered, combined with the fitting part, to the motor vehicle manufacturer. The spring element is then advantageously already in the mounting position, so that only the locking head has to be inserted in order to connect the end of the seat belt.

Another preferred embodiment of the invention can be realized by forming the spring element such that it braces itself against two opposite edges of the second opening. This proposed design of the spring element is advantageous, because in this way the spring element braces itself in the opening due to the directions in which the spring forces act. Furthermore, the proposed embodiment is advantageous when there are accelerations that act in the direction of the spring forces, because in this way, even if the spring element becomes detached from one edge of the fitting part due to the action of the accelerations, there is always a stronger force exerted on the other edge due to the acceleration.

It is also proposed that the locking head has grooves aimed in the direction of the relative movement, the fitting part engaging the edges of the second opening in these grooves after executing the relative movement. In this way, the locking head is secured, both against twisting and against slipping laterally out of the second opening of the fitting part.

Furthermore, the locking head can have at least one flange, and the second opening can have a recess adapted to the shape of the flange, into which recess the locking head of the flange can be inserted, the grooves being arranged in the flange. With the flange and the recesses adapted to the shape of the flange, a predetermined mounting position is defined in the longitudinal direction of the locking head. At the same time, the flanges, which protrude radially outward, are used to position the grooves, so that the locking head can be inserted into a section without grooves between the flanges, the locking head preferably having, in this section, a thickness, or as the case may be a diameter that corresponds to the width of the second opening.

In addition, it is proposed that the locking head has at least one flat portion that enables mounting of the locking head in one predetermined direction only. Such alignment of the locking head is particularly advantageous when the locking head has lateral grooves that should be pre-aligned, in the mounting position, for the execution of the relative movement with respect to the edge of the second opening.

In addition, it is proposed that a retaining element is provided that can be guided into a section of the second opening uncovered by the relative movement of the locking head. By means of the retaining element, unintentional release of the locking head from the locked position can be prevented, particularly at higher rates of acceleration. In addition, use of the retaining element has the advantage that the uncovered section and the locking element can be dimensioned such that the locking element can only be arranged in the section if the locking head is in the locked position. Moreover, with the retaining element, a kind of control function can be put into practice, this meaning a check of whether the locking head is locked as intended, because incomplete locking will automatically make mounting the retaining element impossible.

Furthermore, it is proposed that the fitting part has, in an edge that delimits the second opening, a trough-shaped molding that can receive the fitting part. By means of the molding, a central direction of the application of force of the attachment part to the fitting part can be achieved, which is practical for the stress on the locking head and the fitting part in the sense of a smallest possible maximum component stress.

Furthermore, it is proposed that a tensioning device is provided on the attachment part, which when activated abruptly tensions the seat belt by retracting the fitting part into a tensioning device, the relative movement of the locking head then being aligned with the tensioning direction.

Moreover it is proposed that the combined locking head and fitting part is secured in the locked position by two halves of a housing put in place from the outside. The housing halves serve the purpose of additionally securing the quick-release closure against unintentional release and also provide protection against external mechanical stresses.

Furthermore, it is proposed that the attachment part is a piano wire (or similar to piano wire), and that the locking head is formed by a metal sleeve that is integrally molded to the piano wire. Piano wires have proved their worth as flexible attachment parts, both for directly attaching the end of the seat belt to the motor vehicle and for transmitting force to end-fitting tensioners. At low cost, the locking head can be formed as a metal sleeve which at the same time covers the end of the piano wire. In addition, the contour of the locking head can be formed during molding of the metal sleeve, or alternatively, in order to improve the injection process, it can be used as a fixation element to prevent displacement.

BRIEF DESCRIPTION OF THE DRAWINGS

The invention will be described in more detail below using a preferred exemplary embodiment. The following details are seen in the figures:

FIG. 1 shows component parts of the inventive quick-release closure before and after assembly;

FIG. 3 shows the inventive quick-release closure and locking head in a mounting position;

FIG. 4 shows the inventive quick-release closure and locking head in a locking position.

DETAILED DESCRIPTION OF THE INVENTION

Figure 2:
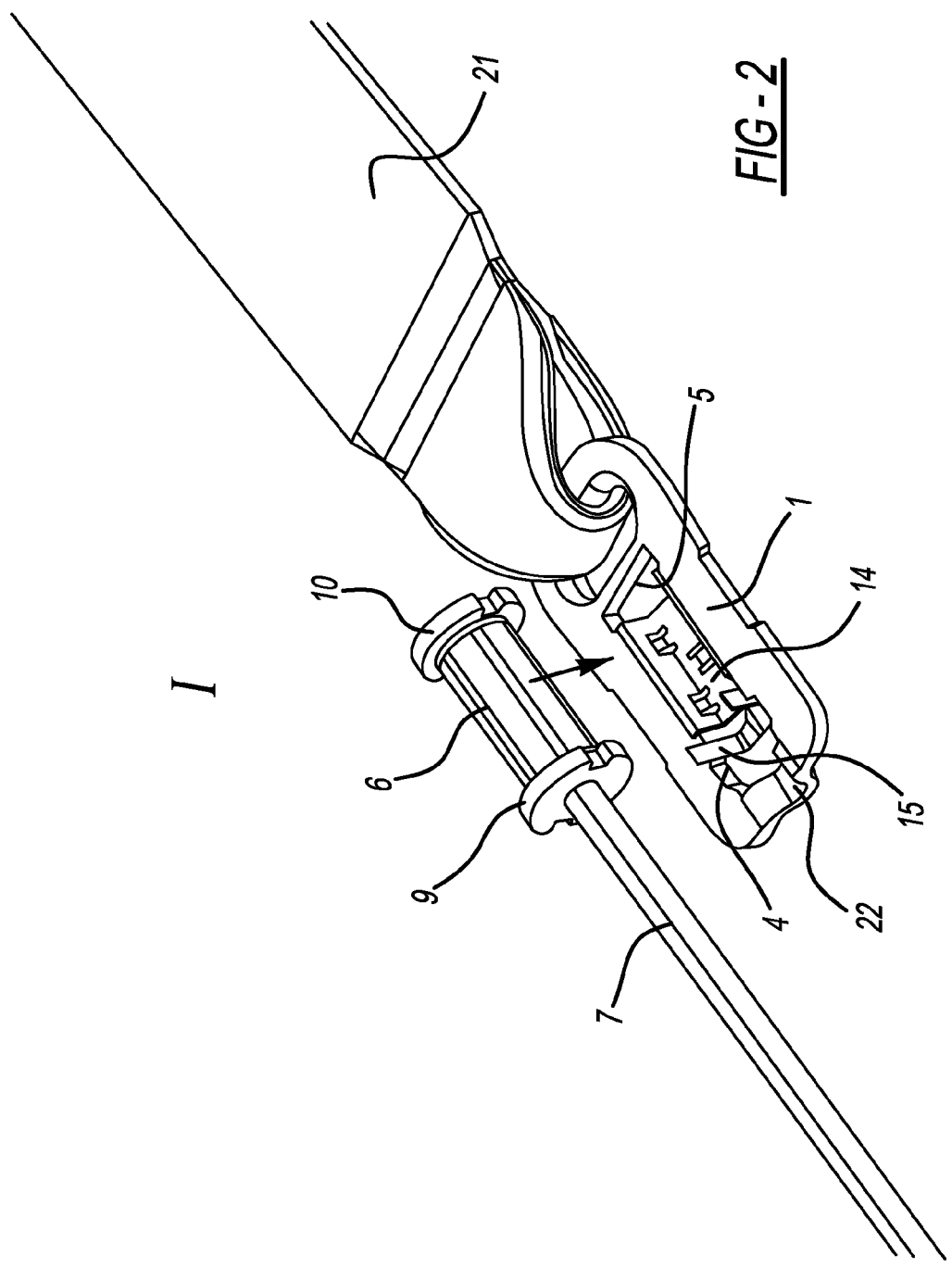
FIG. 2 shows the inventive quick-release closure with attachment part before assembly.

In FIG. 1, the component parts of a quick-release closure are shown before assembly. A fitting part 1 (or bracket) can be seen, which is formed as a stamped part from a metal plate, and which has a first opening 2 and a second opening 3. The first opening 2 is oval in shape and serves to attach a loop of a seat belt 21 shown in the FIGS. 2 to 4. The end of the seat belt 21 that is attached by means of the loop is, for example, the free end of a lap-belt section of the seat belt.

The second opening 3 is rectangular in shape and has two longer edges 24 and 25 which lie opposite each other, each of which, at their ends, passes with greater width into recesses 4 and 5. The recess 4, starting from the area of greater width, is once again narrowed by protrusions 8 extending into the recess 4.

Furthermore, an attachment part 7 in the form of wire such as piano-type wire can be seen, which for example serves the purpose of direct attachment to the motor vehicle, or which can also be part of a tensioning device permanently arranged on the motor vehicle. The attachment part 7 is alternately referred to herein as the piano wire. It is noted that other types of wire attachment parts may also be used and are encompassed by the described elements, including wire, piano wire, piano-type wire, wire rope, and other flexible connecting elements. At the end of the attachment part 7, a locking head formed by a molded-on metal sleeve 6 is provided. The locking head 6 itself has a middle section 26 with lateral flattenings 13 and two outwardly protruding flanges 9 and 10 which delimit the middle section 26; grooves 11 and 12 being provided laterally in each flange. The grooves 11 and 12 and the flattenings 13 are respectively arranged on identically aligned sections of the external circumferences of the middle section 26 and the flanges 9 and 10.

Furthermore, a spring element 14 can be seen, which is formed as a stamped part from a thin spring steel plate that is plastically deformed into a U-shape in cross section during stamping. In cross section, the spring element 14 is formed into a U-shape with two bent-up edges 18 lying opposite to each other and also has outwardly protruding tabs 16 and 17. Between the tabs 16 and 17 and the edges 18, the spring element 14 is provided on both sides with a bead 19 extending in the longitudinal direction of the spring element 14.

In addition, a retaining element 20 can be seen, which is also stamped out of a thin spring plate.

In FIG. 2, the quick-release closure is seen in a preassembled state. One end of a seat belt 21 has been inserted into the first opening 2 and formed into a loop. The spring element 14 has been placed in the second opening 3 in a position in which the upturned edges 18 of the spring element 14 are braced against the edges 24 and 25 of the second opening 3. Here the spring element 14 is secured in the second opening 3 by means of the edges 18 being pressed together, and each edge in that way exerting a spring force on the edges 24 and 25 of the fitting part 1. In this way, there is also additional securing of the spring element 14 due to the edges 24 and 25 fitting into the beads 19. The fitting part 1 can therefore be delivered to the motor vehicle manufacturer with the spring element 14 on the end of the seat belt 21, without the spring element 14 being able to slip out of the second opening 3. Furthermore, on one edge of the spring element 14, two protruding spring arms 15 are provided, which are connected to the spring element 14 via a narrowing in the material 15a. With the connection via the narrowing in the material 15a of them 15, the spring arms 15 can execute independent spring movements with respect to the spring element 14, at the same time as they can also provide a spring effect that is different from the spring effect of the spring element 14.

The locking head 6 of the attachment part 7 is then guided for mounting into the second opening 3 with the spring element 14 placed there, whereby the alignment of the locking head 6 during the insertion movement is predefined by the flanges 9 and 10 engaging with the recesses 4 and 5, and the flattenings 13 being laterally aligned, so that the middle section 26 comes to rest flush with the edges 24 and 25 of the fitting part between the edges 18 of the spring element 14 and the grooves 11 and 12. In the edge section that delimits the second opening 3 in the fitting part 1, there is a trough-shaped deepening 22 in which the piano wire is accommodated in the mounting position I, so that the attachment part 7 transfers any drag (tension) forces that occur approximately centrally in the direction of the plane of the plate-shaped fitting part 1.

After the insertion of the locking head 6, the quick-release closure is in a mounting position I shown in FIG. 3. Starting from the mounting position I, the attachment part 7 is moved by pulling in the direction of the arrow A into the locking position II shown in FIG. 4. In the process, the locking head 6 executes a linear relative movement with respect to the fitting part 1. Due to the contact of the radically protruding flange 10 with the spring element 14, the spring element is moved as well. During this movement, the spring element 14 is guided into the beads 19 by the contact with the edges 24 and 25. Due to the relative movement of the locking head 6, a section 23 and a projection of the edges 24 and 25 of the fitting part 1 are guided into the grooves 11 and 12, and the spring element 14 is moved so far that the spring arms 15 engage in the recess 4. In this position of the locking head 6, or as the case may be of the spring element 14, designated as locking position II in the present application, the locking head 6 is secured against a backward movement into the mounting position I by the spring arms 15 locking in place in the recess 4. In addition, the protrusions 8 that engage the grooves 11 and 12, and the sections 23 secure the locking head 6 against twisting and against a movement in a lateral direction in the event of lateral accelerations.

Figure 5:
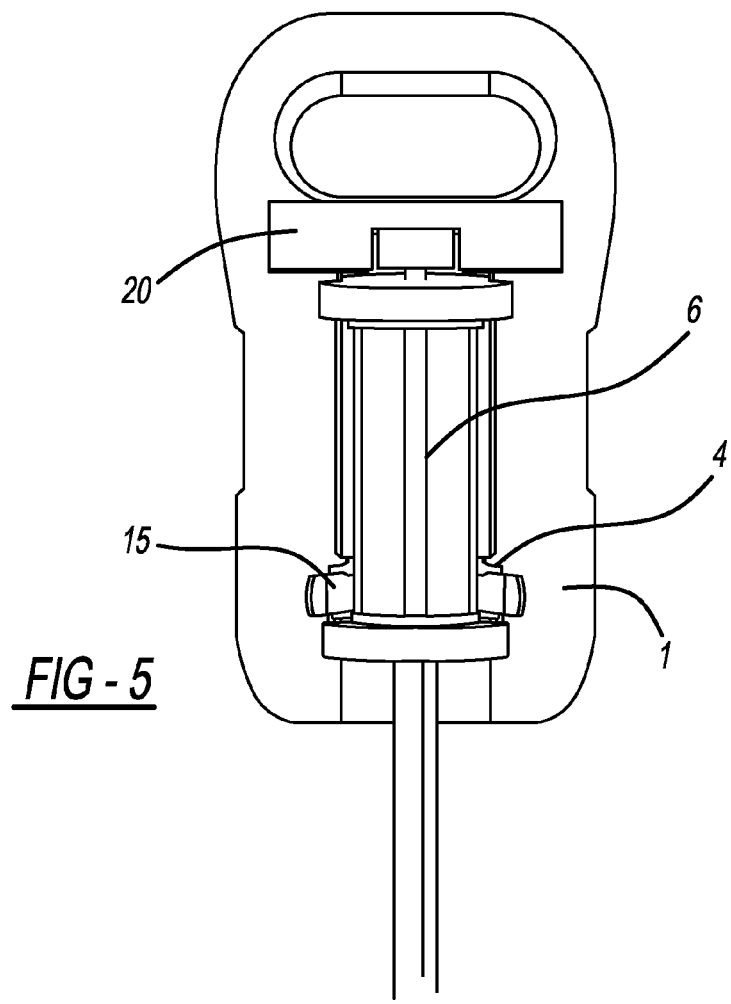
FIG. 5 shows the inventive quick-release closure with inserted locking head in the locking position and with an inserted retaining element.

Due to the relative movement executed by the locking head 6 in the second opening 3, a section is uncovered in the second opening 3, which, with complete locking of the locking head 6 in the locking position II, enables the insertion of the retaining element 20 as shown in FIG. 5. The retaining element 20 additionally secures the locking head 6 against unintentional release of the locking head 6 from the locking position II. Furthermore, the arrangement of the retaining element 20 provides an additional possibility of checking whether the locking head 6 is completely locked in the locking position II, because if not, the retaining element 20 cannot be inserted.

The advantage of the proposed quick-release closure is seen in the relative movement of the locking head 6 from the mounting position I into the locking position II being aligned in the same direction as the drag (tension) forces exerted when the seat belt 21 is put under strain, or as the case may be in the same direction as the drag (tension) forces exerted by a tensioning device arranged on the attachment part 7. That being the case, it can be reliably prevented that the locking head 6 will become detached from the fitting part 1 in the event of strain being put on the seat belt. In addition, the locking head 6 is also secured against unintentional release in the event of lateral acceleration by the fitting part 1 engaging the grooves 11 and 12. The spring element 14 is secured in the locking position II by means of the spring arms 15 engaging the recess 4 on opposite sides, so that even though the lateral accelerations could result in the spring arms 15 on one side being forced out of the recess 4, the spring arms 15 on the opposite side would be forced into the recess by a correspondingly greater force, so that the spring arms 15 would secure the locking head 6 via an at least one-sided engagement of the spring arms 15 in a longitudinal direction with the recess 4.

Figure 6:
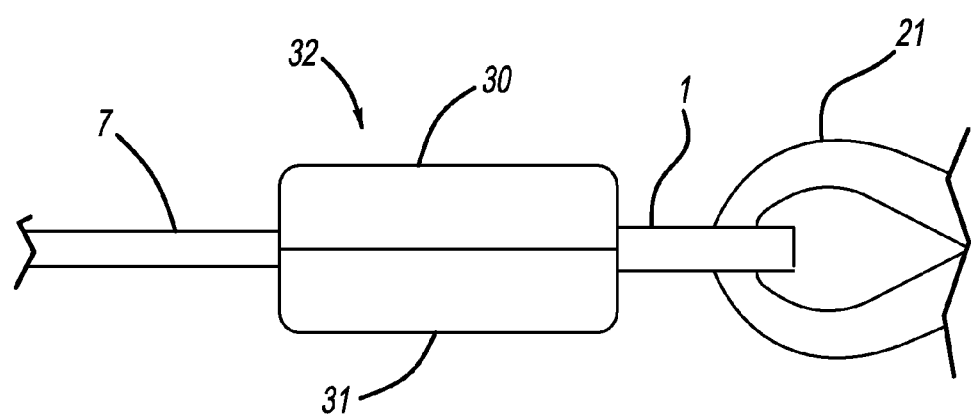
FIG. 6 shows the inventive quick-release closure with two halves of a housing securing the locking head and a fitting part in the locked position.

With reference to FIG. 6, in one embodiment, the combined locking head 6 and fitting part 1 is secured in the locked position by two halves 30, 31 of a housing 32 put in place from the outside. The housing halves 30, 31 serve the purpose of additionally securing the quick-release closure against unintentional release and also provide protection against external mechanical stresses.

While the above description constitutes the preferred embodiment of the present invention, it will be appreciated that the invention is susceptible modification, variation and change without departing from the proper scope and fair meaning of the accompanying claims.

The invention claimed is:

1. A quick-release fastener for a vehicle-fixed end of a safety belt in a motor vehicle comprising:
   a fitting part,
   a fastening element having a locking head adapted to be fastened to the vehicle, wherein
   in the fitting part a first opening is provided in which one end of the safety belt can be fastened via a loop guided through the first opening, and wherein a second opening is provided, in which the fastening element can be locked, a spring element is provided in the second opening, which can be displaced by linear relative movement with respect to the fitting part from a mounting position to a locking position, the fastening element with the locking head can be inserted into the second opening, in which the spring element is installed in the mounting position, and the spring element can be moved to the locking position securing the locking head into engagement with the fitting part upon the locking head undergoing the relative movement;

wherein the spring element is formed by a spring steel sheet which is shaped in such a manner that in the mounting position the spring element fixes itself in the second opening by exerting a spring pretension on the fitting part.

2. A quick-release fastener according to claim 1, wherein the second opening forms a recess, against which the spring element rests in the locking position.

3. A quick-release fastener according to claim 2, wherein the spring element forms at least one protruding spring arm, and that the spring element with the spring arm engages with the recess.

4. A quick-release fastener according to claim 3, wherein the at least one spring arm is located on the spring element via a narrow point of material.

5. A quick-release fastener according to claim 3, wherein two of the spring arms are provided, which in the locking position exert spring forces on the fitting part acting in opposite directions.

6. A quick-release fastener according to claim 2, wherein the recess forms a detent contour.

7. A quick-release fastener according to claim 1, wherein the spring element is shaped in such a manner that it is supported on two opposite edges of the second opening.

8. A quick-release fastener according to claim 7, wherein the locking head forms grooves which are directed in the direction of the relative movement, and into which the fitting part engages with the edges of the second opening after undergoing the relative movement.

9. A quick-release fastener according to claim 8, wherein the locking head forms one or more outward-protruding flanges, and that the second opening forms one or more recesses conforming to the shape of the flanges, into which recesses the locking head with the flanges can be inserted to the mounting position.

10. A quick-release fastener according to claim 9, wherein the grooves are located in the flanges.

11. A quick-release fastener according to claim 1, wherein the locking head forms at least one flat portion which enables the locking head to be mounted in a predetermined alignment only.

12. A quick-release fastener according claim 1, wherein a locking element is provided, which can be inserted into a section of the second opening upon the relative movement of the locking head to the locking position.

13. A quick-release fastener according to claim 1, wherein the fitting part forms a channel-like stamping located in an edge portion defining a portion of the second opening, in which stamping the fastening element can be received.

14. A quick-release fastener according to claim 1, wherein a tensioning device acts upon the fastening element which upon activation tightens the safety belt in a tensioning direction by retracting the fitting part and that the relative movement of the locking head is oriented in the same direction as the tensioning direction.

15. A quick-release fastener according to claim 1, wherein the composite of the locking head and the fitting part in the locking position is secured by two housing halves placed thereon from the outside.

16. A quick-release fastener according to claim 1, wherein the fastening element is in the form of a wire, and that the locking head is formed by a metal sleeve pressed on the wire.

* * * * *